United States Patent [19]
Yang et al.

[11] Patent Number: 6,036,726
[45] Date of Patent: *Mar. 14, 2000

[54] PROCESS FOR SEPARATING POLYAMIDE FROM COLORANT

[75] Inventors: Yiqi Yang, Charlottesville, Va.; Le Moyne W. Plischke, Lillian, Ala.; George R. McLellan; Jerauld L. Dickerson, both of Pensacola, Fla.

[73] Assignee: Solutia Inc., St. Louis, Mo.

[*] Notice: This patent issued on a continued prosecution application filed under 37 CFR 1.53(d), and is subject to the twenty year patent term provisions of 35 U.S.C. 154(a)(2).

[21] Appl. No.: 09/019,910

[22] Filed: Feb. 6, 1998

Related U.S. Application Data

[63] Continuation-in-part of application No. 08/736,575, Oct. 24, 1996, abandoned.
[60] Provisional application No. 60/005,948, Oct. 27, 1995.

[51] Int. Cl.[7] .............. C08J 11/08; C08J 11/24; C09B 67/54; D06L 3/00
[52] U.S. Cl. .............. 8/102; 8/101; 8/440; 521/40; 528/491; 528/494; 528/495; 528/496; 528/499
[58] Field of Search .............. 8/440, 102, 101; 521/40; 528/491, 494, 495, 496, 499

[56] References Cited

U.S. PATENT DOCUMENTS

| | | | |
|---|---|---|---|
| 1,547,187 | 7/1925 | Weiss . | |
| 2,639,278 | 5/1953 | Stott et al. . | |
| 2,742,440 | 4/1956 | Stott et al. . | |
| 2,820,770 | 1/1958 | Adams . | |
| 2,840,606 | 6/1958 | Miller . | |
| 2,872,420 | 2/1959 | Kruyff . | |
| 2,921,038 | 1/1960 | Gunther . | |
| 2,985,500 | 5/1961 | Janson et al. | 8/102 |
| 3,006,867 | 10/1961 | Simon . | |
| 3,043,785 | 7/1962 | Wright et al. | 521/47 |
| 3,468,974 | 9/1969 | Elgin . | |
| 3,562,373 | 2/1971 | Logrippo . | |
| 3,591,325 | 7/1971 | Sapers | 8/102 |
| 3,892,845 | 7/1975 | Cunningham et al. . | |
| 3,908,680 | 9/1975 | Krezanoski . | |
| 4,003,880 | 1/1977 | Sidebotham et al. . | |
| 4,013,575 | 3/1977 | Castrantas et al. . | |
| 4,014,736 | 3/1977 | Sexton . | |
| 4,020,020 | 4/1977 | Appleyard et al. . | |
| 4,028,159 | 6/1977 | Norris . | |
| 4,046,621 | 9/1977 | Sexton | 162/40 |
| 4,105,593 | 8/1978 | Stavrinou . | |
| 4,116,851 | 9/1978 | Rupe et al. . | |
| 4,118,187 | 10/1978 | Sidebotham et al. | 8/102 |
| 4,137,393 | 1/1979 | Sidebotham et al. | 528/491 |
| 4,146,704 | 3/1979 | Seki et al. | 528/323 |
| 4,158,646 | 6/1979 | Benkowski et al. . | |
| 4,227,881 | 10/1980 | Fono | 8/102 |
| 4,238,281 | 12/1980 | Histed | 162/60 |
| 4,301,000 | 11/1981 | Ramkin . | |
| 4,518,459 | 5/1985 | Freis et al. . | |
| 4,539,827 | 9/1985 | Klein et al. . | |
| 4,546,128 | 10/1985 | Nakajima | 523/222 |
| 4,594,371 | 6/1986 | Nauman | 523/340 |
| 4,608,122 | 8/1986 | Klein et al. . | |
| 4,666,961 | 5/1987 | Nauman | 523/340 |
| 4,775,697 | 10/1988 | Schoenhard | 521/48 |
| 4,783,193 | 11/1988 | Pensa | 8/102 |
| 5,061,735 | 10/1991 | Zielinski | 521/46.5 |
| 5,085,734 | 2/1992 | Griggs | 162/19 |
| 5,145,616 | 9/1992 | Sadanobu et al. | 264/29.2 |
| 5,164,043 | 11/1992 | Griggs et al. | 162/57 |
| 5,164,044 | 11/1992 | Griggs et al. | 162/57 |
| 5,169,876 | 12/1992 | Heitmann et al. | 521/155 |
| 5,188,708 | 2/1993 | Griggs et al. | 162/40 |
| 5,198,471 | 3/1993 | Nauman et al. | 521/46.5 |
| 5,211,811 | 5/1993 | Griggs et al. | 162/40 |
| 5,275,024 | 1/1994 | Parks | 68/9 |
| 5,278,282 | 1/1994 | Nauman et al. | 528/497 |
| 5,294,384 | 3/1994 | David et al. | 264/37 |
| 5,296,099 | 3/1994 | Griggs et al. | 162/57 |
| 5,409,570 | 4/1995 | Griggs et al. | 162/40 |
| 5,430,068 | 7/1995 | Subramanian | 521/40 |
| 5,441,603 | 8/1995 | Griggs et al. | 162/57 |
| 5,454,935 | 10/1995 | Magaraggia | 209/169 |
| 5,456,725 | 10/1995 | Bruhnke | 8/403 |
| 5,466,335 | 11/1995 | Parks | 162/60 |
| 5,482,594 | 1/1996 | Salminen | 162/60 |
| 5,840,773 | 11/1998 | Booij et al. | 521/49 |
| 5,849,804 | 12/1998 | Sarian et al. | 521/49.8 |
| 5,898,063 | 4/1999 | Stefandl | 528/480 |

FOREIGN PATENT DOCUMENTS

| | | |
|---|---|---|
| 788009 | 6/1968 | Canada . |
| 603434 | 6/1994 | European Pat. Off. . |
| P4014012 | 10/1991 | Germany . |
| 49-108198 | 10/1974 | Japan . |
| 51-17989 | 2/1976 | Japan . |
| 52-26555 | 2/1977 | Japan . |
| 54-99173 | 8/1979 | Japan . |
| WO96/02590 | 2/1996 | WIPO . |

OTHER PUBLICATIONS

Battle et al. Plastics Recycled by Selective Dissolution, The DeWitt Conference (Mar. 25–27, 1992) (revised 1996).
Nauman et al. Rensselaer's Selective Dissolution Process For Plastics Recycling, The Isermann Department of Chemical Engineering, Rensselaer Polytechnic Institute, Feb. (1996).

(List continued on next page.)

*Primary Examiner*—Alan Diamond
*Attorney, Agent, or Firm*—Arnold White & Durkee

[57] ABSTRACT

A process for recycling colored polyamide material comprises the steps of (a) contacting solid colored polyamide material with an organic solvent composition at a temperature effective to dissolve the polyamide, thereby forming a solution containing colorant and dissolved polyamide; and (b) separating colorant from the polyamide. The process can optionally further comprise the step of recovering the colorant, recovering the polyamide, or recovering both the polymer and colorant. The organic solvent composition preferably is selected from the group consisting of aliphatic and aromatic ketones, aliphatic and aromatic alcohols, diols, water, and combinations thereof. Solvent compositions comprising at least one alcohol selected from the group consisting of butanediol, butanol, ethanol, and benzyl alcohol are preferred, such as aqueous solutions of 1-butanol or ethanol.

46 Claims, 3 Drawing Sheets

OTHER PUBLICATIONS

Chavan, Stripping Of Dyestuffs From Textiles, Silk & Rayon, vol. XII (2): 167–170, Feb. (1969).

Chemi–Washer, Black Clawson Multi–Stage Horizontal Pulp Washer Bulletin No. 66–SBB (Date Unknown).

Coffey, Characteristics Of The Chemi–Washer At G–P's Bellingham And Crossett Mills, Pulping Technology, Paper Trade Journal (Aug. 15, 1982).

Derwent Publication Listing (08254V), Jan.–1974.

Chemical Abstract Search, (1995) (Month Unknown).

Textile Technology Digest Search (date unknown).

Derwent Search, (Apr. 4, 1996).

Derwent Search, (Apr. 27, 1995).

Derwent Search, (Mar. 25, 1996)).

Muguet et al., Ozone bleaching of recycled paper, Tappi Journal, vol. 76, No. 11, pp. 141–145 (1992) (Month Unknown).

Wagner, A new technology for recycling carpet waste, Chemiefasern/Textilindustrie, vol. 28/80, pp. 644–648 (Jul. 1978).

Carpets from plastic waste, Soviet Technology Alert, vol. 1, No. 3 (Mar. 1988).

Derwent Abstract JP 74001036 (Jan. 11, 1974).

Derwent Abstract DE 2425751 (Dec. 11, 1975).

Derwent Abstract DE 3816894 (Nov. 30, 1989).

Derwent Abstract JP 54117579 (Sep. 12, 1979).

Derwent Abstract JP 58119821 (Jul. 16, 1983).

Derwent Abstract JP 60185823 (Sep. 21, 1985).

Derwent Abstract JP 60206868 (Oct. 18, 1985).

Derwent Abstract JP 60219016 (Nov. 1, 1985).

Derwent Abstract JP 51017989 (Feb. 13, 1976).

Derwent Abstract JP 49108198 (Oct. 15, 1974).

Derwent Abstract JP 52026555 (Feb. 28, 1970).

PROCESS FOR SEPARATING POLYAMIDE FROM COLORANT

This is a continuation-in-part of U.S. patent application Ser. No. 08/736,575, filed on Oct. 24, 1996, now abandoned which claims the benefit of Provisional Application No. 60/005,948, filed on Oct. 27, 1995.

BACKGROUND OF THE INVENTION

1. Field of the Invention

The present invention is generally directed to a method of recycling colored polyamides. In particular, the method of the present invention is useful in recycling post-consumer materials, such as carpets, that contain colored polyamide fibers.

2. Background

As the amount of available landfill space decreases, and the number of articles manufactured from synthetic polymers increases, the need for environmentally responsible methods for disposal of these polymer-containing articles increases. A welcome alternative to landfill disposal is recycling and reuse of the synthetic polymer material in products which may be the same as or entirely different from the original article.

One significant limitation to the utility of recycled synthetic polymer material is the imparted color. Colorants, additives, or dyes are commonly added to virgin polymers for both practical and aesthetic reasons. However, the colorant, additive, or dye may significantly impair the processability of or degrade the polymer during conventional recycling processes. Further, the presence of colorant, additive, or dye may limit the potential downstream uses of the recycled polymeric material, as any color change desired in the downstream use could be limited if not impossible given the original article's color. In some cases, an article otherwise suitable for recycling is rejected completely and deposited in a landfill simply because its color is undesirable or inappropriate for a particular downstream use.

Processes for stripping dyes from or decolorizing various materials are known in the art. For example, U.S. Pat. No. 4,227,881 discloses a process for stripping dyes from textile fabric which includes heating an aqueous solution of an ammonium salt, a sulfite salt and an organic sulfonate to at least 140° F. (60° C.) and adding the dyed fabric to the heated solution while maintaining the temperature of the solution. In addition to the costly heating and temperature maintenance step, this process has the drawback of producing fabrics which after processing exhibit a remaining color depth. U.S. Pat. No. 4,783,193 discloses a process for stripping color from synthetic polymer products by contacting the colored polymer with a chemical system. The described process uses unstable dispersions of alkyl halides and aqueous solutions of bleaching/oxidizing agents to which specified quantities of acids and surfactant/wetting agents are added. Among the drawbacks are the use of potentially hazardous halogens and the special provisions required to prevent escape of vapors which could cause environmental harm. Further, the use of the chemical system may restrict or eliminate the polymeric material's recycleability. In general, processes which utilize harsh stripping agents destroy the usefulness of the colorant, thus generating a chemical waste stream that must be treated or disposed of in an environmentally conscious manner. These methods can also generate unremovable colorant fragments which limit the downstream recycleability and utility of the color-stripped material.

Thus an unmet need exists for a cost-effective and environmentally friendly process for separating polymers from colorants, additives, or dyes, without degrading or otherwise decreasing the polymeric material's potential use.

SUMMARY OF THE INVENTION

The present invention concerns a process for recycling colored polyamide material, which comprises the steps of: (a) contacting solid colored polyamide material with an organic solvent composition at a temperature effective to dissolve the polyamide, thereby forming a solution containing colorant and dissolved polyamide; and (b) separating colorant from the polyamide. Although not all of the colorant present will necessarily be removed after a single separation step, a substantial amount of the colorant (e.g., at least about 50% of the colorant present) is preferably removed. The process can be repeated as many times as necessary to achieve a desired level of colorant removal.

The process can optionally further comprise the step of recovering the separated colorant. Alternatively, the process can further comprise the step of recovering the polyamide. Therefore, the process of the present invention can be used to recover either one or both of the polymer and colorant. Because the molecular weight of the polyamide is substantially unchanged (e.g., no more than about a 5% change in average polymer molecular weight) during this processing, the polymer is very suitable for reuse.

The solid colored polyamide material can be in a variety of forms, such as fibers, fabrics, shaped solid articles, etc. In a preferred embodiment of the process, the colored polyamide of step (a) is from carpet.

The temperature at which the polyamide is contacted with the organic solvent composition in step (a) preferably is approximately equal to or higher than the solution glass transition temperature of the polyamide. In a preferred embodiment of this process, the temperature of step (a) is between about 140°–220° C., more preferably about 160–180° C.

After dissolution of the polyamide in the solvent, the solution is preferably then cooled to a temperature effective to cause precipitation of the polyamide. The precipitated polyamide will contain substantially less (e.g., about 50% less) colorant than the feed polyamide material. Separation of colorant from polyamide in step (b) optionally can be enhanced by contacting the solution with an active decoloring agent. The active decoloring agent can be selected from the group consisting of activated carbon, anion exchange resin, cation exchange resin, ion-pair resin, and combinations thereof. In other words, use of an active decoloring agent in the solution prior to cooling can increase the overall removal of colorant.

The organic solvent composition preferably is selected from the group consisting of aliphatic and aromatic ketones, aliphatic and aromatic alcohols, diols, combinations thereof, and combinations of one or more of these compounds with water. Solvent compositions comprising at least one alcohol selected from the group consisting of butanediol, butanol, ethanol, and benzyl alcohol are suitable. Some preferred organic solvent compositions comprise an aqueous solution or dispersion of 1-butanol or ethanol.

In another embodiment of the process, the colorant comprises an acid dye, and the process further comprises adding a base to the solution of step (a), thereby causing the acid dye and the added base to form an insoluble salt. This insoluble salt can be removed, for example, by filtration. Quaternary ammonium compounds are useful as the base in this embodiment of the invention.

One particular embodiment of the invention is a process for recycling post-consumer carpet containing colored polyamide fibers. This process comprises the steps of: (a) contacting solid colored polyamide fibers with an organic solvent composition at a temperature at least as high as the solution glass transition temperature of the polyamide, thereby forming a solution containing dissolved polyamide; and (b) separating colorant from the polyamide. Optionally, the process can further comprise the step of physically separating the backing of the carpet from the colored polyamide fibers prior to step (a). This physical separation can be accomplished, for example, by a method selected from the group consisting of shearing, cutting with a hot wire, cutting with a laser, and combinations thereof. Whether or not the backing is removed, it is presently preferred to reduce the colored polyamide fibers into smaller particles (e.g., by shredding or grinding) prior to being dissolved. After dissolution at elevated temperature, insoluble materials can be separated from dissolved polyamide, for example, by a method selected from the group consisting of filtration, centrifugation, and combinations thereof.

Another particular embodiment of the invention is a process for recycling post consumer carpet containing colored nylon fibers, comprising:

(a) separating dirt and other loosely-attached foreign materials from carpet having nylon face fibers;

(b) grinding, cutting, or shearing the colored nylon fibers into particles having reduced size;

(c) dissolving the nylon in a solvent composition comprising alcohol at a temperature at least as high as the solution glass transition temperature of the polyamide;

(d) separating insoluble materials from dissolved nylon by a method selected from the group consisting of filtration, centrifugation, and combinations thereof;

(e) separating colorant from nylon by contacting the solution with an active decoloring agent; and (f) cooling the dissolved nylon to a temperature of 140° C. or less, thereby causing nylon to precipitate. The alcohol solution in which the nylon is dissolved preferably comprises at least about 50% by weight alcohol, and the remainder water. After dissolution the nylon preferably makes up from about 10–20 weight % of the solution.

The process can optionally further comprise washing the precipitated nylon with a liquid selected from the group consisting of alcohol, water, and mixtures thereof. The alcohol used in washing preferably is selected from the group consisting of ethanol, butanol, isopropanol, benzyl alcohol, 1,4-butanediol, 1,5-pentanediol, and mixtures thereof.

Another embodiment of the invention is a process for removing colorant from colored polyamide, comprising:

(a) dissolving a colored polyamide in a solubilizing solvent so as to give a first polymer-containing solution, the polymer-containing solution including polyamide and soluble colorants;

(b) decreasing the concentration of the soluble colorants in the first polymer-containing solution so as to give a second polymer-containing solution, the second polymer-containing solution having a decreased amount of soluble colorants and the solubilizing solvent, and (c) recovering the polyamide from the second polymer-containing solution. In this embodiment of the invention, the second polymer-containing solution is what is left behind after dye and adhesive are removed from the first polymer-containing solution.

Yet another embodiment of the invention is a process for recovering polyamide from post-consumer carpets containing polyamide and soluble colorant components, the process comprising:

(a) dissolving at least a portion of the polyamide component and at least a portion of the soluble colorant component in a solubilizing solvent so as to give a first polyamide-containing solution and undissolved carpet materials, the first polyamide-containing solution including at least a portion of the polyamide and at least a portion of the soluble colorant components;

(b) separating the undissolved carpet materials from the first polyamide-containing solution;

(c) contacting the first polyamide-containing solution with an active decoloring agent in an amount and for a period of time sufficient to decrease the concentration of the soluble colorant component from the first polyamide-containing solution;

(d) separating the active decoloring agent from the first polyamide-containing solution so as to give a second polyamide-containing solution; and (e) recovering the polyamide from the second polyamide-containing solution.

Prior art decolorization methods have often involved removing colorants from a solid polymeric material, such as fibers, fabrics, carpets, or molded resins. The present invention instead removes colorant from a polymer-containing solution, and offers an economical and simple means of recycling colored polymer materials. The present invention does not substantially degrade the polymer and therefore the recovered polymer can be used in new polymeric materials or articles without the need for repolymerization. The present invention can remove a wide variety of color-imparting agents from the polymeric material, and can remove substantial amounts of colorants from polymer, even if the colorants are deeply penetrated into the polymeric material or are in the form of large aggregates inside voids in the polymeric material. The present invention can also remove impurities other than colorants from the polymeric material. One particularly advantageous use of the present invention is in recycling post-consumer carpet.

Because the process of the present invention does not substantially degrade the dye or other colorant in the process of separating it from the polymer, the colorant itself can be recovered and reused. Therefore, in different embodiments of the invention, the process might involve recovering only the polymer, recovering only the colorants, or recovering both the polymer and the colorants for separate reuse.

DESCRIPTION OF SPECIFIC EMBODIMENTS

Figure 1:
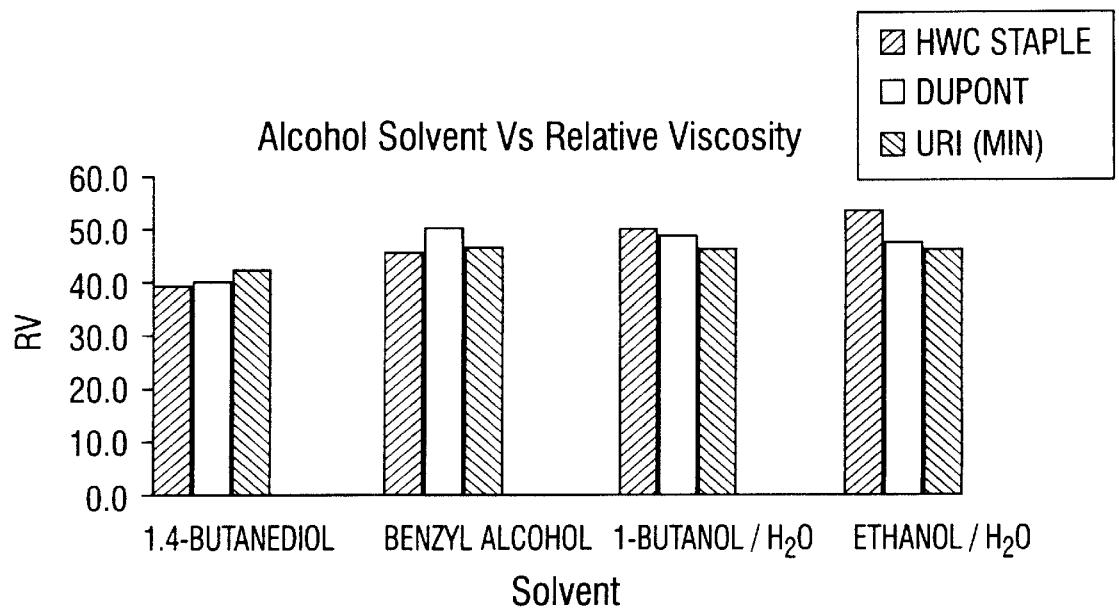
FIG. 1 is a graph of the relative viscosity (RV) of the polymer recovered when post-consumer carpet was processed in accordance with the present invention, using different solvent compositions.

The following terms and phrases are used herein and are intended to have the following meaning:

"Additive" is defined as any intentionally or accidentally added material that affects the properties of the polymeric material.

"Color" is defined to include intentionally imparted visual appearance such as color imparted by dyes and accidentally imparted visual appearance such as stains and the like.

"Colorant" is defined as any dye, pigment, or colored composition or combinations thereof that may intentionally or accidentally color or stain polymeric materials.

"Dye" is defined as an organic material which imparts color to a polymer and which chemically bonds to the polymer primarily by ionic or associative mechanisms.

"Polyamide" is defined as any known polymer, copolymer, terpolymer and the like as well as the blends or alloys thereof having an amide bond as a principle linking group between monomers. Examples include nylon 6; nylon 6,6; and nylon 6,10.

"Solvating agent" is defined as a material capable, under specified conditions, of interrupting the molecular forces within the polymer matrix, resulting in the dissolution of the polymer material. The term "solvate," as utilized herein, is defined as the substantial dissolution of the macroscopic structure or form or shape of the polymeric material.

All percentages herein are by weight unless otherwise specified.

One embodiment of the invention is a process for recovering polyamide from post consumer carpet, and includes the steps of (1) preparing the feedstock, (2) dissolution, (3) removal of insoluble materials, (4) separating polymer from colorant, and (5) washing the recovered nylon.

The first step in this embodiment of the process, preparing the feedstock, involves separating carpets having polyamide fibers from carpets having only non-polyamide fibers (e.g., polypropylene, polyester). Spectral analysis (e.g., near infrared), solubility analysis, stain analysis, or other fiber identification methods known in the art could be used for the separation. A particularly preferred polyamide fiber material for use in this process is nylon 6,6, and a large volume of post-consumer carpet having such fibers is available.

The carpet will typically be colored, and thus will contain one or more dyes or other colorants. The carpet may also contain one or more additives other than colorants. Dyes for which the process of the present invention is particularly useful include acid dyes, which are known to impart color to nylons, especially nylon 6,6. Other dyes can also be removed using the process of the present invention. Other colorants for which the process of the present invention would be useful include the natural and synthetic pigments, such as carbon black or colored transition metal oxides, and colored compositions that may stain the colored polymeric material, for example common food items such as coffee, fruit and vegetable material, juices and extracts, red wine, and natural and synthetic inks.

After separation of non-polyamide carpets, the polyamide carpets can be prepurified before dissolution. The prepurification can include mechanical separation of dirt and other loosely attached foreign materials, and washing the carpet with detergent and water.

Although it is presently preferred to use whole carpet (i.e., including backing and adhesive) in the remainder of the process, it is also possible to first separate the carpet's face fibers from the carpet backing materials before the dissolution process. This can be done mechanically, for example by shearing, hot-wire cutting or laser cutting the fibers from the backing, or by other means known to those skilled in this art.

The prepurified feed material (whether containing backing or not) preferably is cut, ground, or shredded into particles of reduced size, before being fed to the dissolution step. This will increase the surface area of the colored polymer that will contact the solvent composition.

The feed is then contacted with an organic solvent composition in order to cause dissolution of the polymer. The organic solvent composition contains one or more solvating agents. The solvating agent should be capable of interrupting the molecular forces within the polymeric material matrix, resulting in the dissolution of the polymeric macro-structure. The choice of solvating agent will depend on the nature of the colored polymeric material and the conditions of the solvating step. For example, if nylon 6,6 is the polymeric material, the solvating agent may be any material known to be capable of dissolving nylon 6,6. In certain embodiments of the present invention, the solvating agent may be part of a solvent composition in which the solvating agent is at least partially miscible with the other components (e.g., water) in the solvent composition during the solvating step.

It will be apparent to one of ordinary skill in the art that the exact nature and amount of solvating agent utilized in the solvating composition will vary depending upon the conditions, such as temperature, pressure, pH, residence time, etc., utilized during the solvating step. In embodiments where the dye is to be re-used, it should also be kept in mind that the solvating composition should preferably be substantially non-reactive with the dye.

Examples of suitable solvating agents include aliphatic and aromatic alcohols, aliphatic and aromatic ketones, water, and mixtures, solutions, emulsions or dispersions thereof. One group of preferred solvating agents is $C_1$ to $C_{10}$ alcohols. Diols are another suitable example. Particularly preferred examples include benzyl alcohol, methanol, ethanol, 1- and 2-propanol, 1-butanol, cyclohexanol, 1,4-butanediol, and 1,5-pentanediol, as well as mixtures thereof with each other and with water. Ethanol is particularly preferred because it is an inexpensive, easy to handle, environmentally friendly compound. Where the solvent composition comprises an alcohol and water, the alcohol preferably makes up at least about 5% by weight of the composition.

The colored polymeric material preferably is contacted with the solvent composition under elevated temperature. The pressure at which the solvating step is carried out will depend upon the solvent since the pressure is a result of the solvent vapor pressure. It is preferred that the solvating step be carried out at a temperature above the solution glass transition temperature ($T_g$) of the colored polymeric material in the process environment (i.e., in the presence of the solvent). It should be recognized that the glass transition temperature changes when solvent is added to the polymer. Preferred temperatures for nylon 6,6 are between about 10–250° C., more preferably between about 80–250° C. In certain embodiments of the process, the temperature is preferably between about 120–250° C., more preferably between about 140–220° C., most preferably between about 160–180° C. Suitable pressures can be between about atmospheric pressure and about 300 psig, preferably between about atmospheric pressure and 250 psig. Elevated pressure may be that provided by an inert gas, such as nitrogen or argon, or it may be the pressure generated by the vaporization of the liquids in the solvating composition in a pressure vessel.

The residence time for solvating the colored polymeric material can be controlled to ensure the most economic recovery of material. Suitable residence times for the solvating step will depend on the polymer and the conditions of the solvating step, but will usually range from about 0.5–60 minutes, preferably form about 0.5–30 minutes. In embodiments where the total solvation of the polymeric material is not desired, the preferred residence time can be between about 0.5–20 minutes, more preferably between about 1–10 minutes. For example, in one experiment, total solvation was achieved in five minutes at 170° C. In another embodiment of the process, the time of contact can suitably be between about 10–30 minutes. The solution containing the polymer and the solvent preferably has an alcohol concentration of from about 50–100 weight percent, and a nylon concentration between about 0.1–35 weight percent, most preferably between about 10–20 weight percent.

The amount of solvating agent in the solvent composition will depend on the desired conditions of the solvating step and on each other. Further variables such as the nature and amount of the polymeric material, the nature and amounts of the dye(s) or other colorant(s) present in the polymer, the depth of color shade, and the like, are preferably considered.

The solvating step may include a plurality of solvating stages wherein the colored polymeric material is contacted repeatedly with a solvating agent.

The solvating step may be performed using a variety of techniques known to person having ordinary skill in the art. Such techniques include immersing the colored polymeric material in the solvating agent, applying an effective amount of the solvating agent onto the polymeric material, and the like. The solvating step can be carried out as either a batch or continuous process.

Agents to modify pH are generally not needed. High pH would enhance the solubility of a dye and retard removal by, e.g., activated carbon.

After the polymer is dissolved, any insoluble materials that are present can be removed. Examples of materials that can be removed in this step are carpet backing materials, such as polystyrene butadiene, calcium carbonate, and polypropylene, and insoluble colorants and other additives such as carbon black, pigment, and titanium dioxide. It should be appreciated that while some of the colorants in the carpet may be insoluble and thus subject to removal in this step, other colorants may be soluble in the same solution that dissolves the polymer. The process of the present invention can be used with carpet that contains either type of colorant, or both.

The insoluble materials can be removed by a variety of methods, including filtration, centrifugation, and the like.

After removal of insolubles, at least some of the remaining soluble colorants (and other soluble non-polyamide materials) can be separated from the nylon or other polyamide. One way of doing this is to cool the solution to less than about 140° C. (e.g., by air cooling), so that the polyamide present in the solution will precipitate. In this embodiment of the invention, the precipitated polyamide can then be removed, by, for example, filtration or centrifugation. Further removal of soluble colorants can be achieved by dissolving in more solvent and precipitating the polyamide optionally without use of the decoloring agent. This can be repeated as many times as necessary to achieve the decolored polyamide. It should be recognized that after separation of dye from the polymer solution, there will usually be some impurities in both the dye and the solvent.

Separation techniques include ultrafiltration (although ultrafiltration will typically not remove the dye but will remove other impurities in the solution), ion exchange, extraction (e.g., supercritical fluid extraction), contacting with an active decoloring agent, and combinations of these methods. Choice of the appropriate recovery method will depend on the characteristics of the dye and the formulation of the solvating composition, and the solubility characteristics of both the dye and the polymer.

If an active decoloring agent is used, it can be, for example, activated carbon, cation exchange resin, anion exchange resin, ion-pair resin, or a combination of one or more of these materials. One suitable activated carbon material that is commercially available is Type CPG Granular Carbon (e.g., mesh size 12×40), available from Calgon Carbon Corporation. (Activated carbon having mesh size between 12 mesh and 40 mesh is preferred.) The active decoloring agent is preferably added to the solution in a weight ratio of about 200:1 decoloring agent:dye or a weight ratio of about 1:1 decoloring agent: polymer. The contact time between the solution and the active decoloring agent is sufficient to remove the desired degree of color. Then, the active decoloring agent can be separated from the solution by, e.g., filtration.

After the polyamide and the colorants are thus separated, the polyamide can optionally be washed, to remove any residual dye, colorant, or solvating agent. Alternatively, the washing step can itself perform the function of separating polyamide and colorants. Suitable washing agents should at least partially solubilize the residual dye, colorant, or solvating agent without harm to the decolorized colored polymeric material. Washing agents preferably are polar liquids such as alcohols, water, and mixtures thereof. Preferred examples include $C_1$–$C_4$ aliphatic alcohols, $C_3$–$C_6$ ketones, and mixtures thereof. Specific preferred alcohols for this step include ethanol, isopropanol, n-butanol, benzyl alcohol, 1,4-butanediol, and 1,5-pentanediol. Acetone, water, and mixtures thereof are another preferred group of liquids for the washing step. The washing is preferably conducted at a temperature between about 10–140° C.

The polymer left after this processing can then be formed into new articles for sale, such as fibers, shaped articles, and the like. The polymer can have new colorants added to it, and they need not impart the same color to the polymer as it previously had before recycling.

One object of the process of the present invention is to perform the solvating step so as to avoid any substantial degradation of the polymer. Although the general shape and integrity of the form of the colored polymeric material, for example fiber, molded part, or the like, is not maintained during the solvating step, the molecular weight of the polymer is not dramatically reduced. Therefore, the polymer can be reused without the expense of repolymerization.

The colorants can also be reused after they are separated from the polymer. In some instances, the colorants might be sufficiently more valuable than the polymer that the operator of the process would recover and reuse the colorant, while merely disposing of the polymer rather than reusing it. Therefore, commercial embodiments of the present invention could include recovering only the polymer for reuse, recovering only one or more colorants for reuse, and recovering both polymer and colorant(s) for reuse.

The process of the present invention permits the decolorization of colored polymeric materials without the need for harsh stripping agents. Stripping agents are defined herein as materials which oxidize, reduce or otherwise destroy the dye chromophore. Because of the highly reactive chemical nature of such stripping agents, their use can limit or prevent the reuse of the recovered materials. The solvating step in the process of the present invention is preferably conducted in the absence of such stripping agents. Thus the resulting polymeric material can fully replace or be blended with virgin polymer for use in articles that conventionally decolorized polymeric material cannot presently be used.

The following examples are included to demonstrate certain specific embodiments of the invention.

EXAMPLE 1

A sample of acid-dyed nylon 6,6 was dissolved in butanediol at a temperature from about 140° to 220° C. (e.g., 160° C.) and at a nylon concentration of 0.1 to 35 weight percent, giving a colored solution including nylon 6,6 and soluble acid dye. Activated carbon in an amount of 0.001 to 100% of the total estimated weight of the nylon 6,6 in solution, was added into the colored solution. The mixture was agitated so as to thoroughly contact the polymer-containing solution with the activated carbon. After a contact time of about 0.1 to about 120 minutes, the activated carbon will be separated from the polymer-containing solution by filtering through a series of filters having a pore size of 1 to 100 microns to remove the activated carbon. Upon cooling below 140° C. and the removal of any pressure, substantially decolored nylon 6,6 will precipitate from the nylon 6,6-containing solution. Not all of the colorant was removed from the nylon, but the removal was sufficient to permit the polymer to be redyed a different color.

EXAMPLE 2

The procedure of Example 1 was used with a combination of ethanol and water as the solvent instead of butanediol. The solvent was 30–90% ethanol.

EXAMPLE 3

The procedure of Example 1 was used with a combination of n-butanol and water as the solvent instead of butanediol. The solvent was 30–90% n-butanol.

EXAMPLE 4

The procedure of Example 1 was used with benzyl alcohol as the solvent instead of butanediol.

EXAMPLE 5

The procedures of Examples 1 to 4 can be repeated substituting for the activated carbon either commercially available cation exchange resin, anion exchange resin, or ion-pair resin. The alternative decoloring agent can suitably have a particle size of greater than 10 microns and a pore size suitable to allow the dye molecules to absorb, but a size too small for the polymers to absorb.

EXAMPLE 6

The procedures of Examples 1 to 5 can be carried out utilizing a nylon in which more than one colorants are present. For example a combination of acid dyed and pigmented nylon 6,6 sample can be used. In such a combination, the colored nylon would be dissolved in a suitable solvent such as ethanol/water (90/10) under pressure generated by the heating of a closed system to above 160° C. Upon dissolution the solution should be filtered through a series of increasingly finer filters so as to remove the solid particles present in solution including the pigment particles. To the filtered solution, a suitable decoloring agent having a particle size greater than 10 microns will be added. The decoloring agent can be selected from activated carbon, cation exchange resin, anionic exchange resin, ion pair resin, size exclusion resin, or combinations of these. The total amount of decoloring agent utilized to remove the acid dye colorant will depend upon both the amount of dye present in the nylon and the desired contact time. One of skill in the art should be able to vary these parameters within the ranges disclosed herein to achieve the desired level of decolorization. After the desired contact time is reached, the mixture of decolorizing agent and nylon solution would be filtered through a micron filter to remove the decolorizing agent particles, preferably a filter for particles greater than 10 microns. Once the decolorizing agent is removed, cooling of the solution to below the boiling point of the ethanol solvent will reduce the pressure and a substantially decolorized polymer will be recovered.

EXAMPLE 7

The procedures of Examples 1 to 6 may be run in a continuous manner by passing the polymer containing solution through a column packed with active decolorizing agent. In such an embodiment, the colored nylon would be dissolved in a suitable solvent such as ethanol/water (60/40) under pressure generated by the heating of a closed system to above 160° C. Upon dissolution the solution would first be filtered through a series of increasingly finer filters so as to remove the solid particles present in solution including any pigment particles. The filtered solution would then be passed through a packed column containing a suitable decoloring agent. The decoloring agent should be selected from activated carbon, cation exchange resin, anionic exchange resin, ion pair resin, size exclusion resin, or combinations of these. The total amount of decoloring agent utilized to form the column will depend upon the diameter and length of the column. The size and diameter of the column should be sufficient enough so as to contain enough active decoloring agent to reduce the concentration of colorant in the polymer solution. By adjusting the length of the column and the flow of the polymer solution through the column, the desired level of decolorization will be achieved. One of skill in the art should be able to vary these parameters within the ranges disclosed herein to achieve the desired level of decolorization. After passage through the column, the polymer-containing solution should be filtered through a micron filter to remove any residual particles, preferably a filter for particles greater than 10 microns. Cooling of the solution and reduction of pressure to ambient conditions and a substantially decolorized polymer will be recovered.

EXAMPLE 8

The studies of examples 8–11 were performed in an autoclave with pressure furnished by a nitrogen cylinder.

Twelve samples of carpet (3 g each) were each placed in a solution consisting of 40 ml of an alcohol/water mixture. All of the samples were placed in the autoclave at the same time. The samples were heated in the autoclave for one hour at 159–171° C. under a pressure of 250 psig. Nylon was separated from the other components in the carpet and recovered by precipitation from the solution.

TABLE 1

| Sample number | Alcohol | Weight ratio alcohol/water |
| --- | --- | --- |
| 1 | methanol | 40/60 |
| 2 | methanol | 50/50 |
| 3 | methanol | 60/40 |
| 4 | ethanol | 40/60 |
| 5 | ethanol | 50/50 |
| 6 | ethanol | 60/40 |
| 7 | n-butyl alcohol | 40/60 |
| 8 | n-butyl alcohol | 50/50 |
| 9 | n-butyl alcohol | 60/40 |
| 10 | benzyl alcohol | 40/60 |
| 11 | benzyl alcohol | 50/50 |
| 12 | benzyl alcohol | 60/40 |

In this study, n-butyl alcohol was the most stable, with the various components remaining separated and held in suspension over a period of several weeks.

EXAMPLE 9

Nylon was recovered from whole carpets which during construction had been dyed a deep shade of blue. The solvents used were methanol, ethanol, and n-butyl alcohol mixed 60/40 (weight %) with water. Three grams of each carpet sample were added to 40 ml of solvent solution. Samples 13–18 were processed at pH of 10 or 12 following the addition of several drops of dilute solutions of NaOH. Samples 19–24 contained, in addition to the alcohol solutions described above, either 10 or 20% hexamethylenediamine.

TABLE 2

| Sample number | Solvent composition | pH |
| --- | --- | --- |
| 13 | 60/40 methanol/water | 10 |
| 14 | 60/40 methanol/water | 12 |
| 15 | 60/40 ethanol/water | 12 |
| 16 | 60/40 ethanol/water | 10 |
| 17 | 60/40 n-butanol/water | 10 |
| 18 | 60/40 n-butanol/water | 12 |

TABLE 3

| Sample number | Hexamethylenediamine content (%) | Solvent composition |
| --- | --- | --- |
| 19 | 20 | 20/20/60 HMD/water/methanol |
| 20 | 10 | 10/10/20/60 HMD/water/added water/methanol |
| 21 | 20 | 20/20/60 HMD/water/ethanol |
| 22 | 10 | 10/10/20/60 HMD/water/added water/ethanol |
| 23 | 20 | 20/20/60 HMD/water/n-butanol |
| 24 | 10 | 10/10/20/60 HMD/water/added water/n-butanol |

The samples were heated in the autoclave for one hour at 159–167° C. under a pressure of 250 psig. Upon cooling to room temperature, all of the samples had separated into layers, some with the nylon powder held in suspension and the backing at the bottom of the test tube, others in several different layers. All of the solutions were blue in color, some a very dark blue.

For samples 13–18, nylon was recovered by means of a pipette, repulped several times in water, and then dried in a forced air oven. The polymer, which now was a very light blue, was arranged in order from the lightest to the darkest in shade: 17>18>14>16>13>15.

EXAMPLE 10

Fiber was cut from a carpet which had never been dyed and which contained only the primary backing. The fiber was washed several times in D.I. water before use to remove any finish. Three grams of fiber was placed in an amount of solvent solution that varied from sample to sample. Samples 25–30 were dissolved in a mixture of n-butyl alcohol or ethylene glycol with water. Samples 31–36 were processed in a manner similar to that for previous samples 13–18 except for addition of a salt to the solvent mixture. Samples 25–36 were processed in the autoclave at the same time for one hour at a temperature from 154–163° C. and a pressure of 250 psig.

TABLE 4

| Sample no. | Solvent | Weight nylon fiber (g) | Vol. solvent (ml) | Approx. % Fiber in Solution |
| --- | --- | --- | --- | --- |
| 25 | 60/40 n-butyl alcohol/water | 3 | 40 | 6.98 |
| 26 | 60/40 n-butyl alcohol/water | 3 | 30 | 9.09 |
| 27 | 60/40 n-butyl alcohol/water | 3 | 24 | 11.11 |
| 28 | 60/40 n-butyl alcohol/water | 3 | 20 | 13.04 |
| 29 | 60/40 ethylene glycol/water | 3 | 40 | 6.98 |
| 30 | 60/40 ethylene glycol/water | 3 | 24 | 11.11 |

TABLE 5

| Sample no. | Solvent | Salt | Weight carpet (g) | Weight salt (g) | pH |
| --- | --- | --- | --- | --- | --- |
| 31 | 60/40 n-butyl alcohol/water | 2% NaCl | 3 | 1 | 10 |
| 32 | 60/40 n-butyl alcohol/water | 2% choline chloride | 3 | 1 | 10 |
| 33 | 60/40 n-butyl alcohol/water | 2% CaCl$_2$ | 3 | 1 | 10 |
| 34 | 70/30 ethanol/water | 2% NaCl | 3 | 1 | 10 |
| 35 | 70/30 ethanol/water | 2% choline chloride | 3 | 1 | 10 |
| 36 | 70/30 ethanol/water | 2% CaCl$_2$ | 3 | 1 | 10 |

The results of this study indicate that at least 13% nylon could be dissolved using a 60/40 n-butyl alcohol/water mixture. Electrolytes such as NaCl might enhance dye removal. Magnesium sulfate, used as a coagulant, might also help in the dye removal. Choline chloride, an example of a quaternary ammonium compound, neutralizes the negatively charged nylon dyes and also helps in the color removal. In this study, ethylene glycol was not a good solvent for nylon 6,6 under the conditions employed. The same was true of glycerol in a subsequent study. It appears that the greater the number of hydroxyl groups on the solvent molecule, the less effective the solvent is in the present process.

EXAMPLE 11

Eighteen runs were performed with twelve samples in each run, for a total of 216 samples in all. The alcohols used included ethanol, isopropanol, and n-butanol. The nylon used was white, virgin fiber. The runs were performed at temperatures of 140, 160, or 180° C. and at a pressure of 250 psig. The weight ratio of alcohol to water was 60/40, 70/30, 80/20, or 90/10. The concentration of fiber in solution was 8.0, 10.5, or 13.0%, based on weight of fiber. The time the samples were held at temperature was 30 minutes for the first set of runs and five minutes for the second set of runs. The results are summarized in the following tables.

TABLE 6

Dissolution of Nylon Fiber in Aqueous Solution of 60–90% Ethanol

| Test | Temp. (° C.) | Time (min.) | Polymer (%) | Ethanol (%) | Observation |
|---|---|---|---|---|---|
| 1 | 140 | 30 | 8–13 | 60–90 | fiber |
| 2 | 160 | 30 | 8–13 | 60–90 | 100% dissolved |
| 3 | 180 | 30 | 8–13 | 60–90 | 100% dissolved |
| 4 | 140 | 5 | 8–13 | 60–90 | fiber |
| 5 | 160 | 5 | 8–13 | 60–90 | 100% dissolved |
| 6 | 180 | 5 | 8–13 | 60–90 | 100% dissolved |

TABLE 7

Dissolution of Nylon Fiber in Aqueous Solution of 60–90% Isopropanol

| Test | Temp. (° C.) | Time (min.) | Polymer (%) | Isopropanol (%) | Observation |
|---|---|---|---|---|---|
| 1 | 140 | 30 | 8–13 | 60–90 | fiber |
| 2a | 160 | 30 | 8–13 | 90 | fiber |
| 2b | 160 | 30 | 8–13 | 60–80 | 100% dissolved |
| 3 | 180 | 30 | 8–13 | 60–90 | 100% dissolved |
| 4 | 140 | 5 | 8–13 | 60–90 | fiber |
| 5a | 160 | 5 | 8–13 | 90 | fiber |
| 5b | 160 | 5 | 8–13 | 60–80 | 100% dissolved |
| 6a | 180 | 5 | 8–13 | 90 | fiber |
| 6b | 180 | 5 | 8–13 | 60–80 | 100% dissolved |

TABLE 8

Dissolution of Nylon Fiber in Aqueous Solution of 60–90% n-Butanol

| Test | Temp. (° C.) | Time (min.) | Polymer (%) | Isopropanol (%) | Observation |
|---|---|---|---|---|---|
| 1 | 140 | 30 | 8–13 | 60–90 | fiber |
| 2 | 160 | 30 | 8–13 | 60–90 | 100% dissolved |
| 3 | 180 | 30 | 8–13 | 60–90 | 100% dissolved |
| 4 | 140 | 5 | 8–13 | 60–90 | fiber |
| 5a | 160 | 5 | 8–13 | 90 | both fiber and ppt. |
| 5b | 160 | 5 | 8–13 | 60–80 | 100% dissolved |
| 6a | 180 | 5 | 8–13 | 60–90 | 100% dissolved |

The 90% isopropanol solvent was unable to dissolve the nylon at either 160 or 180° C. within a five minute period. The n-butanol solvent was unable to dissolve the nylon at 160° C. in that same time period. Thus, it appears that under certain conditions some water is necessary when using either isopropanol or n-butanol, but not when using ethanol.

EXAMPLE 12

Five types of post-consumer carpet were tested with four solvent compositions: 1,4-butanediol, benzyl alcohol, 1-butanol/water (60/40), and ethanol/water (60/40) at 140–190° C. at pressures from atmospheric to 250 psig. The estimated components of the carpet are given in Table 9.

TABLE 9

Estimated Composition of Carpet

| Feedstock | % Nylon 6,6 | % Nylon 6 | % SBR | % CaCO$_3$ | % Polypropylene |
|---|---|---|---|---|---|
| HWC STAPLE | 99+ | 0 | trace | trace | trace |
| DUPONT | 98.5 | 0 | 0.4 | 1.2 | trace |
| URI (min) | 61 | 0 | 6 | 18 | 15 |
| ZIMMER No. 1 | 45 | 0 | 7 | 28 | 20 |
| ZIMMER No. 2 | 70 | 0 | 6 | 18 | 6 |

The dissolution process was successful with each of these post-consumer carpet samples. Backing was removed from nylon by filtration. Data on the recovered polymer was collected for the HWC Staple, Dupont, and URI samples.

Figure 2:
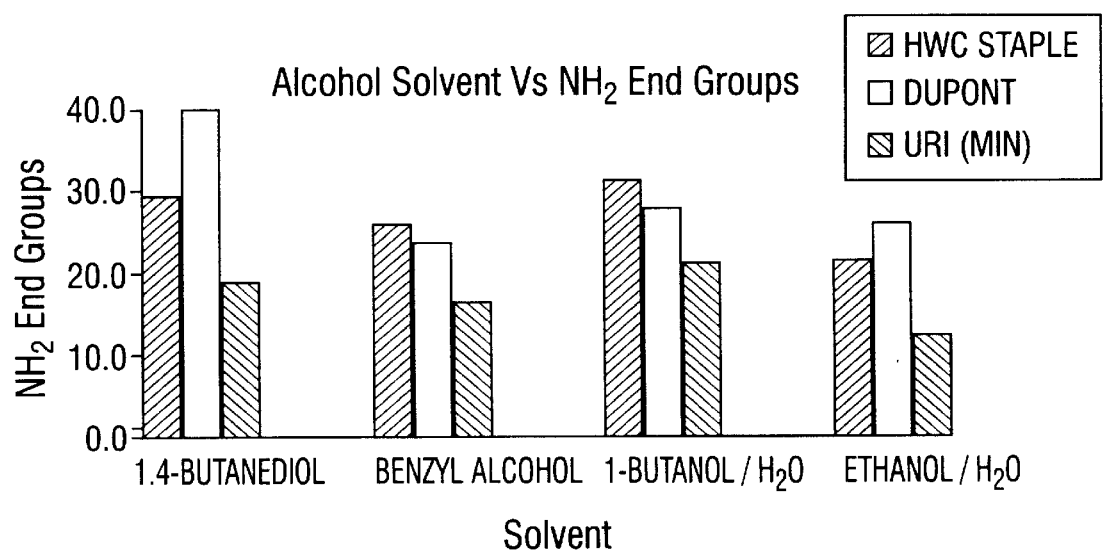
FIG. 2 is a graph of the $NH_2$ end groups for the recovered polymers in the same tests.
Figure 3:
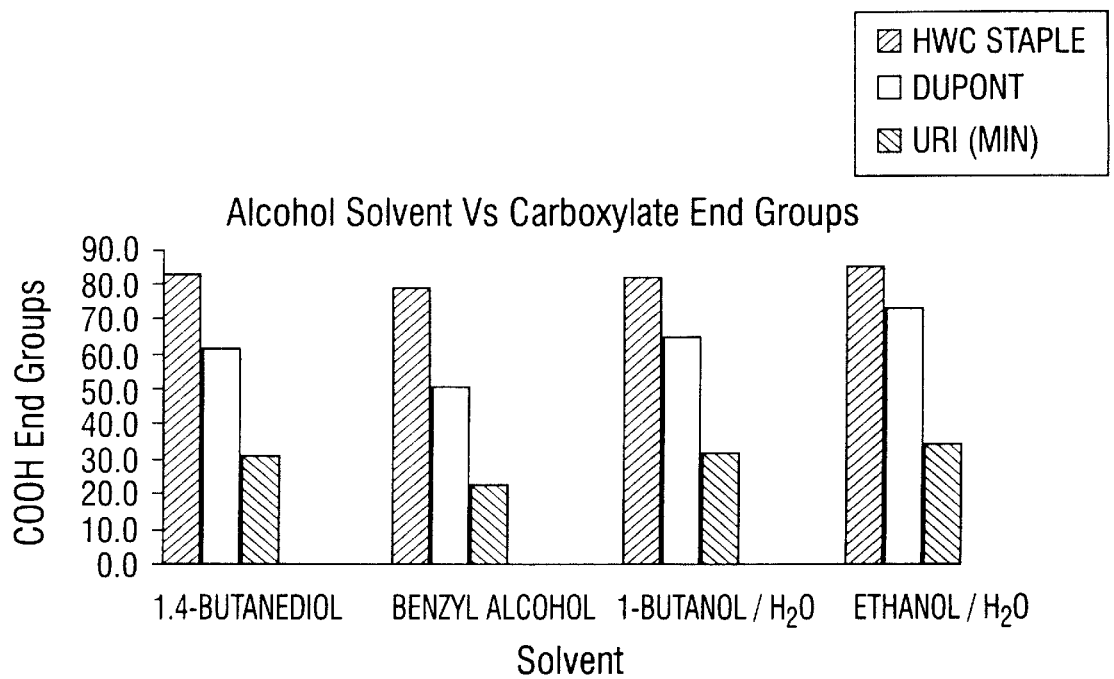
FIG. 3 is a graph of the COOH end groups for the recovered polymers in the same tests.
Figure 4:
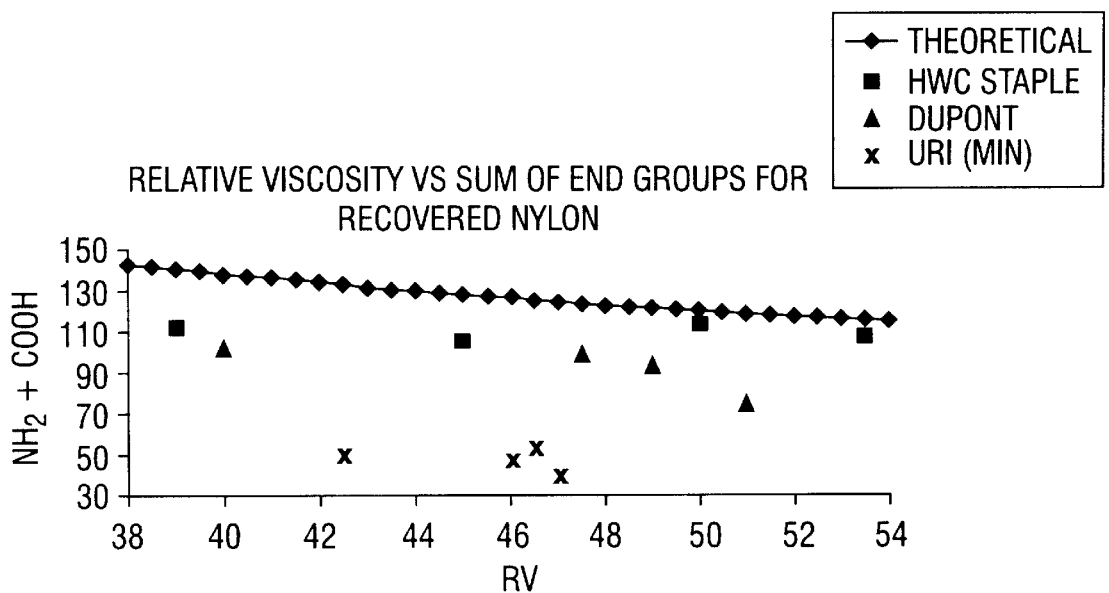
FIG. 4 is a graph of the relative viscosity of the recovered polymer versus the sum of the end groups ($NH_2$ and COOH) for the recovered polymer in the same tests.
Figure 5:
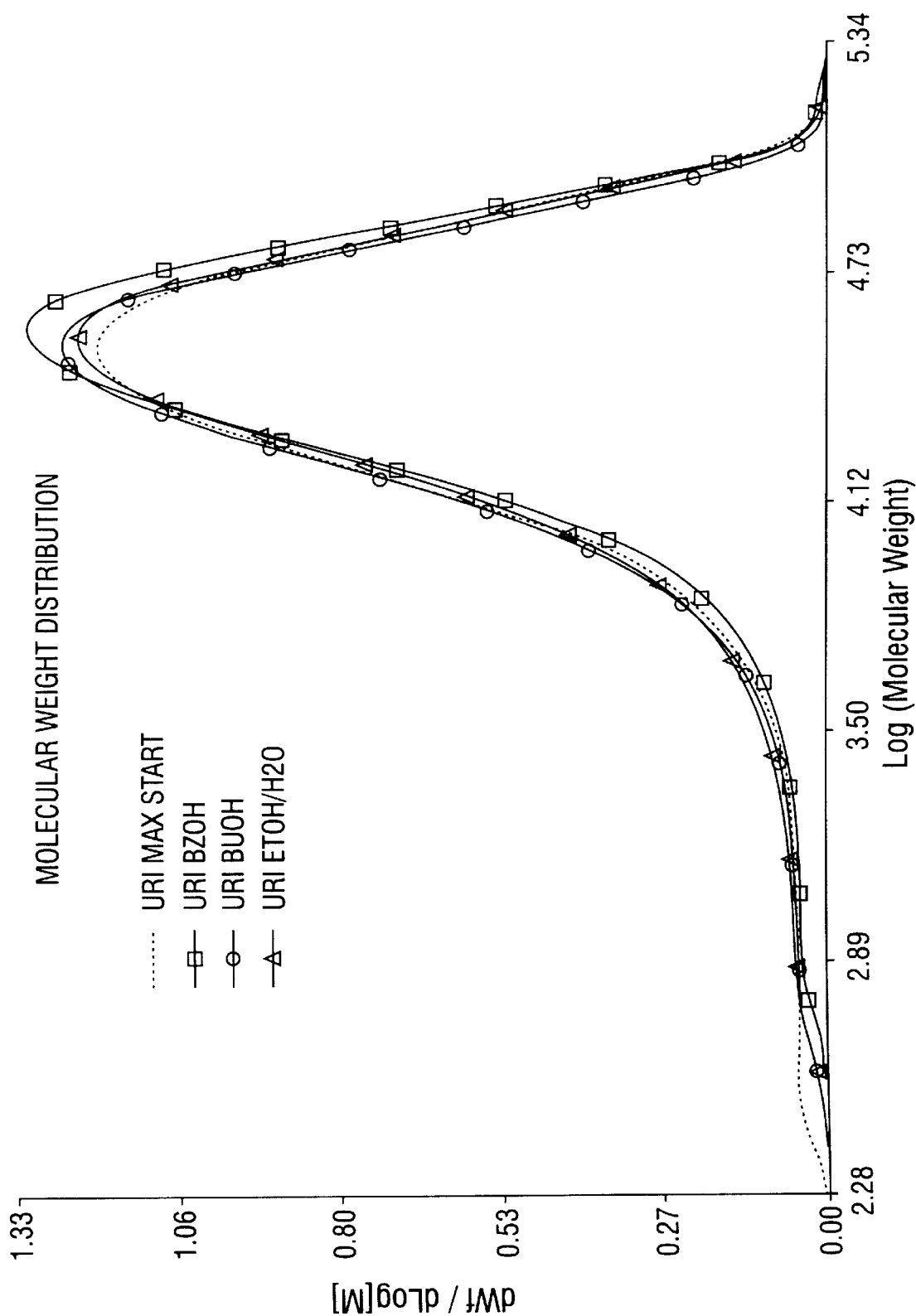
FIG. 5 is a graph of the molecular weight distribution of polymer from one type of carpet in the same tests versus $dW_f/d \log[M]$ (i.e., change in weight fraction, $W_f$, with change in log of molecular weight). "URI MAX-START" refers to the polymer before dissolution, "URI-BZOH" refers to the polymer recovered using benzyl alcohol, "URI-BUOH" refers to the polymer recovered using 1-butanol/water, and "URI-ETOH/H20" refers to polymer recovered using ethanol/water as the solvent composition.

FIG. 1 shows the relative viscosity (RV) of the polymer recovered using the various solvents. FIG. 2 shows the NH$_2$ end groups and FIG. 3 shows the carboxylate end groups for the recovered polymers. FIG. 4 shows RV versus the sum of the end groups (NH$_2$ plus COOH) for the recovered nylon. FIG. 5 shows the molecular weight distribution for polymers recovered from the URI carpet using the various solvents.

The normal value of RV for carpet fiber is from 45–55. From FIG. 1 it is evident that all of the solvents except 1,4-butanediol gave RV values between 45–55. The RV values for 1,4-butanediol were slightly lower, between 39–45. From FIG. 4 it appears that all of the recovered polymers had low end group values with respect to the measured RV values. This may be explained by FIG. 5, which indicates that there was a loss of low molecular weight polymer. It also appears that the sample processed with benzyl alcohol exhibited a small gain in very high molecular weight polymer.

Of the solvent compositions used in these tests, 1-butanol/water and ethanol/water appeared to produce the highest RV values while retaining the best molecular weight distribution and affecting the nylon polymer the least.

EXAMPLE 13

In this experiment, three types of dye were used, Tectilon Blue 4R 200, Tectilon Red 2B 200, and Tectilon Orange 3G 200, representing the anthroquinones, monoazo, and diazo type dyes, respectively. These dyes were put into solution with four different solvent compositions: 1,4-butanediol, benzyl alcohol, 1-butanol/water, and ethanol/water. Different types of Calgon activated carbon were added to the solutions, as listed in the tables, including two different mesh sizes for the TOG and PCB types. Each alcohol-dye sample was reacted for 15 minutes at the temperature indicated in the tables using a 200:1 ratio of activated carbon to dye.

TABLE 10

1,4-Butanediol/Dye Solutions (test performed at 184° C.)

| Activated carbon type | Mesh size | Tectilon Blue removed | Tectilon Red removed | Tectilon Orange removed |
|---|---|---|---|---|
| PCB | 12 × 30 | moderate | none | none |
| CPG-LF | 12 × 40 | all | all | small |
| TOG | 20 × 30 | all | small | moderate |

TABLE 10-continued 1,4-Butanediol/Dye Solutions
(test performed at 184° C.)

| Activated carbon type | Mesh size | Tectilon Blue removed | Tectilon Red removed | Tectilon Orange removed |
|---|---|---|---|---|
| PCB | 30 × 140 | large | none | small |
| TOG | 80 × 325 | all | all | all |

TABLE 11

Benzyl Alcohol/Dye Solutions
(test performed at 200° C.)

| Activated carbon type | Mesh size | Tectilon Blue removed | Tectilon Red removed | Tectilon Orange removed |
|---|---|---|---|---|
| PCB | 12 × 30 | none | small | none |
| CPG-LF | 12 × 40 | none | moderate | none |
| TOG | 20 × 30 | none | moderate | none |
| PCB | 30 × 140 | none | small | none |
| TOG | 80 × 325 | none | all | none |

TABLE 12

1-Butanol/Water/Dye Solutions
(test performed at 100° C.)

| Activated carbon type | Mesh size | Tectilon Blue removed | Tectilon Red removed | Tectilon Orange removed |
|---|---|---|---|---|
| PCB | 12 × 30 | large | none | moderate |
| CPG-LF | 12 × 40 | all | large | all |
| TOG | 20 × 30 | all | moderate | large |
| PCB | 30 × 140 | all | large | large |
| TOG | 80 × 325 | all | all | all |

TABLE 13

Ethanol/Water/Dye Solutions
(test performed at 80° C.)

| Activated carbon type | Mesh size | Tectilon Blue removed | Tectilon Red removed | Tectilon Orange removed |
|---|---|---|---|---|
| PCB | 12 × 30 | all | small | moderate |
| CPG-LF | 12 × 40 | all | all | all |
| TOG | 20 × 30 | all | large | large |
| PCB | 30 × 140 | all | large | large |
| TOG | 80 × 325 | all | all | all |

Larger mesh size indicates a smaller particle size. Smaller particles of activated carbon will absorb dye at a faster rate than will larger particle sizes. Dye absorption capacity is dependent on matching carbon pore size to that of the dye molecule. Further, having more surface area on the activated carbon increases dye loading capacity. Larger dye concentrations produce a faster rate of dye absorption by the activated carbon.

EXAMPLE 14

CPG and TOG type activated carbon were introduced into different solutions of 1-butanol/water in which HWC Atlanta green carpet, a dark green post-consumer carpet, was dissolved (10 weight % carpet, 90% solvent). The temperature was 170° C., the pressure was 225 psig, and a 200:1 ratio of activated carbon to dye was used. Each solution was agitated for 15 minutes. The nylon polymer recovered after precipitation was very light green. To the naked eye it appeared as though most of the dye had been removed.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A process for recycling colored polyamide material, comprising:

(a) contacting solid colored polyamide material containing one or more acid dyes with an organic solvent composition at a temperature effective to dissolve the polyamide, thereby forming a solution containing colorant and dissolved polyamide;

(b) adding a base to the solution, thereby causing the acid dye and the added base to form an insoluble salt; and (c) separating colorant from the polyamide.

2. The process of claim 1, where the temperature of step (a) is at least as high as the solution glass transition temperature of the polyamide.

3. The process of claim 1, where the temperature of step (a) is between about 140°–220° C.

4. The process of claim 1, where the temperature of step (a) is about 160–180° C.

5. The process of claim 1, where the average molecular weight of the polyamide after step (b) changes no more than about five percent from the average molecular weight before step (a).

6. The process of claim 1, where the colored polyamide of step (a) is from carpet.

7. The process of claim 1, further comprising recovering the separated colorant.

8. The process of claim 1, further comprising recovering the polyamide.

9. The process of claim 1, where the solution is cooled to a temperature effective to cause precipitation of the polyamide.

10. The process of claim 1, further comprising the step of removing the insoluble salt by filtration.

11. The process of claim 10, where the added base is a quaternary ammonium compound.

12. The process of claim 1 wherein the organic solvent composition is selected from the group consisting of aliphatic and aromatic ketones, aliphatic and aromatic alcohols, diols, combinations thereof, and combinations of one or more of such compounds with water.

13. The process of claim 12 wherein the organic solvent composition comprises at least one alcohol selected from the group consisting of butanediol, butanol, ethanol, and benzyl alcohol.

14. The process of claim 13, where the organic solvent composition comprises an aqueous solution or dispersion of 1-butanol or ethanol.

15. A process for recycling post-consumer carpet containing colored polyamide fibers, comprising:

(a) contacting solid colored polyamide fibers containing one or more acid dyes with an organic solvent composition at a temperature at least as high as the solution glass transition temperature of the polyamide, thereby forming a solution containing dissolved polyamide;

(b) adding a base to the solution, thereby causing the acid dye and the added base to form an insoluble salt; and (c) separating colorant from the polyamide.

16. The process of claim 15, where the temperature of step (a) is between about 140–220° C.

17. The process of claim 15, further comprising physically separating the backing of the carpet from the colored polyamide fibers prior to step (a).

18. The process of claim 17, where the physical separation is accomplished by a method selected from the group consisting of shearing, cutting with a hot wire, cutting with a laser, and combinations thereof.

19. The process of claim 17, where the colored polyamide fibers are reduced into smaller particles after being separated from the carpet backing and prior to being dissolved.

20. The process of claim 15, where insoluble materials are separated from dissolved polyamide by a method selected from the group consisting of filtration, centrifugation, and combinations thereof.

21. The process of claim 15, further comprising recovering the colorant.

22. The process of claim 15, further comprising recovering the polyamide.

23. The process of claim 15, where the solution is cooled to at least 140° C., thereby causing polyamide to precipitate.

24. The process of claim 15 wherein the organic solvent composition is selected from the group consisting of aliphatic and aromatic ketones, aliphatic and aromatic alcohols, diols, combinations thereof, and combinations of one or more such compounds with water.

25. The process of claim 24 wherein the organic solvent composition comprises at least one alcohol selected from the group consisting of butanediol, butanol, ethanol, and benzyl alcohol.

26. The process of claim 25 where the organic solvent composition comprises an aqueous solution or dispersion of 1-butanol or ethanol.

27. A process for recycling post consumer carpet containing colored nylon fibers, comprising:

(a) separating dirt and other loosely-attached foreign materials from carpet having nylon face fibers;

(b) grinding, cutting, or shearing the colored nylon fibers into particles having reduced size;

(c) dissolving the nylon in a solvent composition comprising alcohol at a temperature at least as high as the solution glass transition temperature of the nylon;

(d) separating insoluble materials from dissolved nylon by a method selected from the group consisting of filtration, centrifugation, and combinations thereof;

(e) separating colorant from nylon by contacting the solution with an active decoloring agent; and (f) cooling the dissolved nylon to a temperature of 140° C. or less, thereby causing nylon to precipitate.

28. The process of claim 27, where the active decoloring agent is activated carbon.

29. The process of claim 27, further comprising physically separating carpet having nylon face fibers from carpet having non-nylon face fibers, prior to the other process steps.

30. The process of claim 27, where, prior to the dissolving of the nylon in the solvent composition, nylon face fibers are separated from the backing of the carpet and only the face fibers are used in the subsequent processing.

31. The process of claim 27 wherein the organic solvent composition comprises at least one alcohol selected from the group consisting of butanediol, butanol, ethanol, and benzyl alcohol.

32. The process of claim 27, where the organic solvent composition comprises an aqueous solution or dispersion of 1-butanol or ethanol.

33. The process of claim 32, where the aqueous solution comprises at least about 50% by weight 1-butanol or ethanol, and the remainder water.

34. The process of claim 27, where after dissolution the nylon makes up from about 10–20 weight % of the solution.

35. The process of claim 27, further comprising washing the precipitated nylon with a liquid selected from the group consisting of alcohol, water, and mixtures thereof.

36. The process of claim 35, where the alcohol used in washing is selected from the group consisting of ethanol, butanol, isopropanol, benzyl alcohol, 1,4-butanediol, 1,5-pentanediol, and mixtures thereof.

37. A process for removing colorant from colored polyamide, comprising:

(a) dissolving a colored polyamide in a solubilizing solvent so as to give a first polymer-containing solution, the polymer-containing solution including polyamide and soluble colorants;

(b) decreasing the concentration of the soluble colorants in the first polymer-containing solution so as to give a second polymer-containing solution, the second polymer-containing solution having a decreased amount of soluble colorants and the solubilizing solvent, and (c) recovering the polyamide from the second polymer-containing solution.

38. A process for recovering polyamide from post-consumer carpets containing polyamide and soluble colorant components, the process comprising:

(a) dissolving at least a portion of the polyamide component and at least a portion of the soluble colorant component in a solubilizing solvent so as to give a first polyamide-containing solution and undissolved carpet materials, the first polyamide-containing solution including at least a portion of the polyamide and at least a portion of the soluble colorant components;

(b) separating the undissolved carpet materials from the first polyamide-containing solution;

(c) contacting the first polyamide-containing solution with an active decoloring agent in an amount and for a period of time sufficient to decrease the concentration of the soluble colorant component from the first polyamide-containing solution;

(d) separating the active decoloring agent from the first polyamide-containing solution so as to give a second polyamide-containing solution; and (e) recovering the polyamide from the second polyamide-containing solution.

39. A process of claim 38, where the active decoloring agent is activated carbon.

40. The process of claim 38, where the active decoloring agent is selected from the group consisting of activated carbon, anion exchange resin, cation exchange resin, ion-pair resin, and combinations thereof.

41. The process of claim 39, where the active decoloring agent is selected from the group consisting of activated carbon, anion exchange resin, cation exchange resin, ion-pair resin, and combinations thereof.

42. A process of claim 41, where the active decoloring agent is activated carbon.

43. The process of claim 41, where the active decoloring agent is selected from the group consisting of activated carbon, anion exchange resin, cation exchange resin, ion-pair resin, and combinations thereof.

44. A process for recycling post-consumer carpet containing colored polyamide fibers, comprising:
- (a) contacting said colored polyamide fibers with an organic solvent composition at a temperature at least as high as the solution glass transition temperature of the polymide, thereby forming a solution containing dissolved polyamide; and
- (b) separating colorant from the polyamide by contacting the solution with an active decoloring agent.

45. The process of claim 44, where the active decoloring agent is activated carbon.

46. The process of claim 44, where the active decoloring agent is selected from the group consisting of activated carbon, anion exchange resin, cation exchange resin, ion-pair resin, and combinations thereof.

* * * * *